United States Patent

Maurice et al.

[15] 3,636,795
[45] Jan. 25, 1972

[54] UNIT POWER PLANTS

[72] Inventors: Jean Maurice; Jean Piret, both of Billancourt, France

[73] Assignees: Regie Nationale Des Usines Renault, Billancourt, France; Automobiles Peugeot, Paris, France

[22] Filed: Nov. 18, 1969

[21] Appl. No.: 877,781

[30] Foreign Application Priority Data

Nov. 26, 1968 France....................................175359

[52] U.S. Cl. ..........................................................74/606 R
[51] Int. Cl. ............................................................F16h 57/02
[58] Field of Search ..........................74/606, 695, 700, 701; 192/110 S; 180/85

[56] References Cited

UNITED STATES PATENTS

| | | | |
|---|---|---|---|
| 1,424,177 | 8/1922 | Nilson | 74/606 |
| 1,660,113 | 2/1928 | Bjur | 74/695 |
| 2,000,605 | 5/1935 | Moorhouse | 74/700 |
| 2,078,034 | 4/1937 | Smith | 74/700 |
| 2,743,784 | 5/1956 | Karlsson | 180/1.5 X |
| 3,017,787 | 1/1962 | Payne | 74/700 X |
| 3,122,944 | 3/1964 | Boehner | 74/700 |
| 3,150,543 | 9/1964 | Dangauthier | 74/700 |
| 3,474,690 | 10/1969 | Lepelletier | 74/732 |

FOREIGN PATENTS OR APPLICATIONS

| | | | |
|---|---|---|---|
| 403,364 | 9/1904 | France | 180/85 |
| 1,153,267 | 10/1960 | Germany | 74/695 |
| 577,988 | 5/1933 | Germany | 74/700 |

*Primary Examiner*—Milton Kaufman
*Attorney*—Stevens, Davis, Miller & Mosher

[57] ABSTRACT

Unit power plant comprising an engine, a one-piece hydraulic torque converter housing, a two-piece differential housing and a one-piece change-speed or transmission casing, which are interconnected through joint planes perpendicular or parallel to the longitudinal axis, and characterized in that at least one of said housings or casings comprises two identical joint planes.

3 Claims, 4 Drawing Figures

PATENTED JAN 25 1972          3,636,795

UNIT POWER PLANTS

The present invention relates to the construction of a power unit and transmission assembly or unit power plant comprising three main elements assembled along planes perpendicular or parallel to the longitudinal axis of the assembly.

It is known that hitherto known unit power plants or power unit and transmission assemblies do not permit the adoption of particularly advantageous designs resulting from the division of the casings into subassemblies, such as the separation of the final drive and differential from the transmission as a whole to provide at will either a front wheel drive or a rear wheel drive.

It is the object of the present invention to provide a power unit and transmission assembly comprising an engine, a one-piece hydraulic torque converter housing, a two-piece differential housing and a one-piece transmission or change-gear casing, these various housings and casings being assembled with one another at joint planes extending at right angles to the longitudinal axis of the assembly, this assembly being characterized in that one of said housing and cases has two identical joint planes.

A particularly advantageous form of embodiment permits converting a front wheel drive vehicle into a rear wheel drive vehicle without appreciably modifying the transmission subassemblies by simply removing the final drive housing assembly and its mechanism from the initial assembly, thus providing an assembly consisting of the mounting of the transmission or change-speed gear casing to the end of the hydraulic converter housing.

A typical form of embodiment of an assembly according to this invention will now be described by way of example with reference to the attached drawing, in which.

Figure 1:
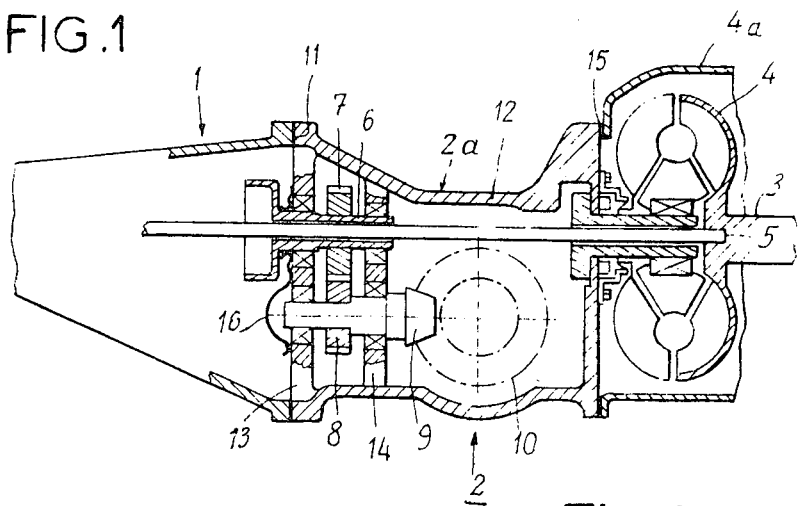
FIG. 1 is a sectional view of a unit power plant according to this invention.

The power unit or engine disposed as usual in opposition to the change-gear mechanism or transmission in relation to the differential is shown diagrammatically in the figures in the form of an engine shaft 3 driving, through the medium of a hydraulic torque converter 4 enclosed in a one-piece housing or casing 4a, an input shaft 5 of the change-gear mechanism or transmission in order to drive, through a pair of meshing pinions 7 and 8, the driving pinion 9 of the differential bevel gears comprising a bevel crown wheel shown diagrammatically at 10.

The gear casing 1 comprising a main body adapted to be assembled at a joint plane 11 perpendicular to the longitudinal axis of the unit with the differential housing 2 consisting on the other hand of a pair of half-casings 2a of which only one is shown, this half-casing 2a having its inherent joint plane 12.

At least one of these half-casings 2a is provided with a pair of transverse partitions 13 and 14 constituting supports for the bearings of the output shaft 6 of the change-speed gear, said shaft 6 carrying the pinion 7, and also of the shaft carrying the differential driving pinion 9 rotatably rigid with the layshaft pinion 8. A seal 16 is provided on the partition 13 for isolating the final drive housing from the change-gear casing and permit the lubrication of the final drive with extreme pressure oil. Thus, the one-piece main casing of the change-speed mechanism is also fluidtight with respect to the final drive housing and contains a lubricant consistent with the mechanism enclosed therein.

The joint plane 15 connecting the housing 4a of the hydraulic torque converter 4 to the differential housing 2 is identical to the joint plane 11 so that the transmission can be mounted at the free end of the torque converter, for example, as a consequence of a modification brought to the unit power plant.

Figure 2:
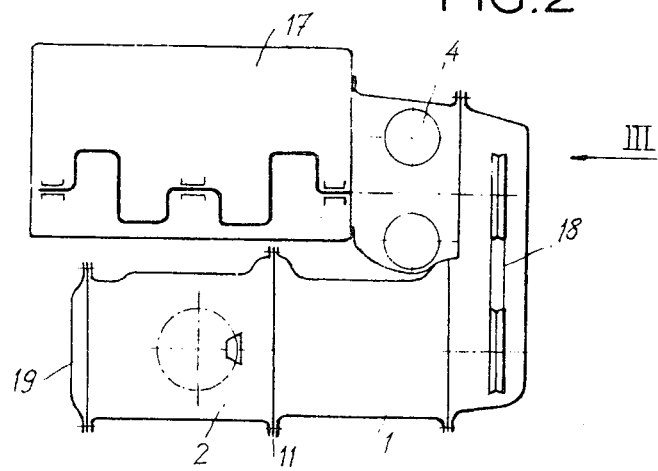
FIGS. 2 and 3 show modified forms of embodiment thereof.
Figure 3:
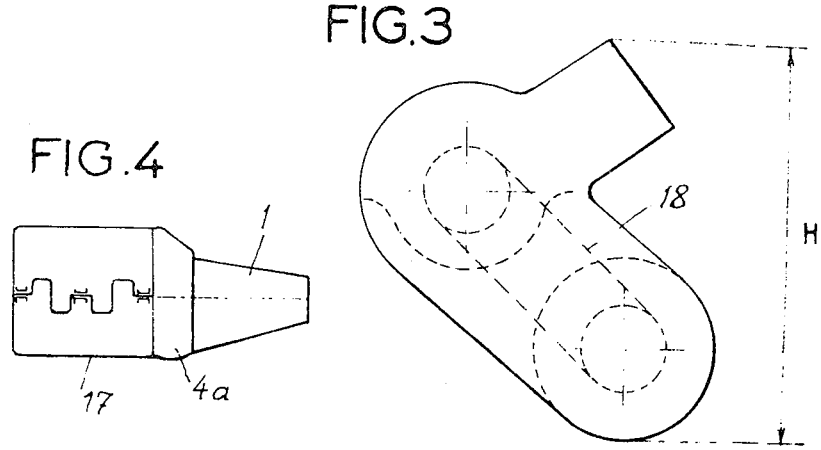

FIGS. 2 and 3 illustrate a modified form of embodiment in diagrammatic view and in end view, respectively, wherein the change-speed gear casing 1 and final drive housing 2 are disposed beneath the engine 17 and offset in relation thereto, in order to provide an adequate height H of the assembly. In this alternate arrangement the transmission and final drive mechanisms are driven from the engine through a transmission chain 18. In comparison with the arrangement of FIG. 1, the final drive housing is mounted on the left-hand side of the transmission and has in common therewith the joint plane 11. The free end face of the final drive housing is closed by a cover 19.

Figure 4:
FIG. 4 is another modified form of embodiment in which the final drive housing and its mechanism have been removed from the power unit and transmission assembly.

FIG. 4 illustrates a modified arrangement wherein the final drive housing and its mechanism are removed from the assembly, this arrangement thus comprising the engine 17, torque converter enclosed in its housing 4a and the change-speed transmission 1.

Of course, various modifications and variations may be brought to the specific forms of embodiment of the present invention which are shown and described herein without departing from the spirit and scope of the invention as set forth in the appended claims.

We claim:

1. A power plant unit comprising an engine connected to a one-piece hydraulic torque converter housing, a one-piece change speed transmission housing connected to a two-piece differential housing disposed beneath the hydraulic torque converter housing and engine in offset relation thereto, and a chain and gear drive housing connected to the torque converter housing and the change speed transmission housing, said engine and housings being connected together by joint planes which are parallel to each other and perpendicular to the axis of the power plant unit.

2. The power plant unit of claim 1 wherein said differential housing has two substantially identical joint planes.

3. The power plant unit of claim 2 wherein the differential housing and change speed transmission housing are fluidtight.

* * * * *